US012795216B2

(12) United States Patent
Saad et al.

(10) Patent No.: US 12,795,216 B2
(45) Date of Patent: Nov. 10, 2026

(54) DYNAMICALLY GENERATING OPTIMIZED VIDEOS

(71) Applicant: Adobe Inc., San Jose, CA (US)

(72) Inventors: Michele Saad, Austin, TX (US); Irgelkha Mejia, River Edge, NJ (US); Ajay Jain, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/748,950

(22) Filed: Jun. 20, 2024

(65) Prior Publication Data

US 2025/0392798 A1 Dec. 25, 2025

(51) Int. Cl.
*H04N 21/8549* (2011.01)
*G06F 16/2457* (2019.01)

(52) U.S. Cl.
CPC ... *H04N 21/8549* (2013.01); *G06F 16/24578* (2019.01)

(58) Field of Classification Search
CPC ...................... H04N 21/8549; G06F 16/24578
See application file for complete search history.

(56) References Cited

U.S. PATENT DOCUMENTS 12,450,301 B1 * 10/2025 Anumanchupallik ...................... G06F 16/9538
2023/0368448 A1 * 11/2023 Wu ...................... G11B 27/031
2024/0147023 A1 * 5/2024 Zhou .................... H04N 21/816
2024/0185306 A1 * 6/2024 Li ......................... G06F 40/295
2024/0378251 A1 * 11/2024 Boyd ...................... G06T 11/60
2024/0394755 A1 * 11/2024 Ding ....................... G06T 11/60
2024/0420404 A1 * 12/2024 Kasap .................. G06F 16/345
2025/0165543 A1 * 5/2025 Sankaranarayanan ....................... G06F 16/9535
2025/0278443 A1 * 9/2025 Lynch ................ G06F 3/04883
2025/0307896 A1 * 10/2025 Scheibelhut ....... G06Q 30/0633

* cited by examiner

*Primary Examiner* — Farzana Hossain
(74) *Attorney, Agent, or Firm* — SHOOK, HARDY & BACON L.L.P.

(57) ABSTRACT

Methods, computer systems, and computer-storage media are provided for efficiently generating an optimized video for a particular user to view the video, among other things. In embodiments, a set of product assets associated with a product is identified based on relevance to intent of a query input by a user. The video summary that provides a manner in which to generate an optimized video associated with the product is generated based on the set of product assets relevant to the intent of the query input by the user and associated with the product. The optimized video associated with the product is generated based on the video summary and an optimal video duration identified for the user. Thereafter, the optimized video that includes content relevant to the intent of the query input by the user and that corresponds with the optimal video duration identified for the user is provided for display.

17 Claims, 8 Drawing Sheets

DYNAMICALLY GENERATING OPTIMIZED VIDEOS

BACKGROUND

Videos are oftentimes provided for users to view product information. As the videos are generally static in content and structure, however, the videos frequently do not include the details desired by the user. For example, a user may be interested in one product aspect, but the video may not include information related to that particular product aspect. Further, the video may be too lengthy to maintain a user's interest in viewing the video. In this regard, even if the video contains the desired information, the user may abandon viewing the video such that the desired product information is not viewed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, efficiently and effectively generating optimized videos, such as product videos, in a dynamic manner. In particular, videos, such as product videos, are generated in a dynamic manner such that the video is tailored to interests and/or desires of a user to view the video. In this regard, a video may be generated to include content and/or to be structured in a manner that is desired by the user. For example, a video associated with a product may be generated based on a user's search query and/or query intent, interaction data in the session, and the like. Advantageously, videos are adapted to interests of a user viewing the video, thereby resulting in a more desired video for the user.

BRIEF DESCRIPTION OF THE DRAWINGS

The technology described herein is described in detail below with reference to the attached drawing figures, wherein.

DETAILED DESCRIPTION

Figure 1:
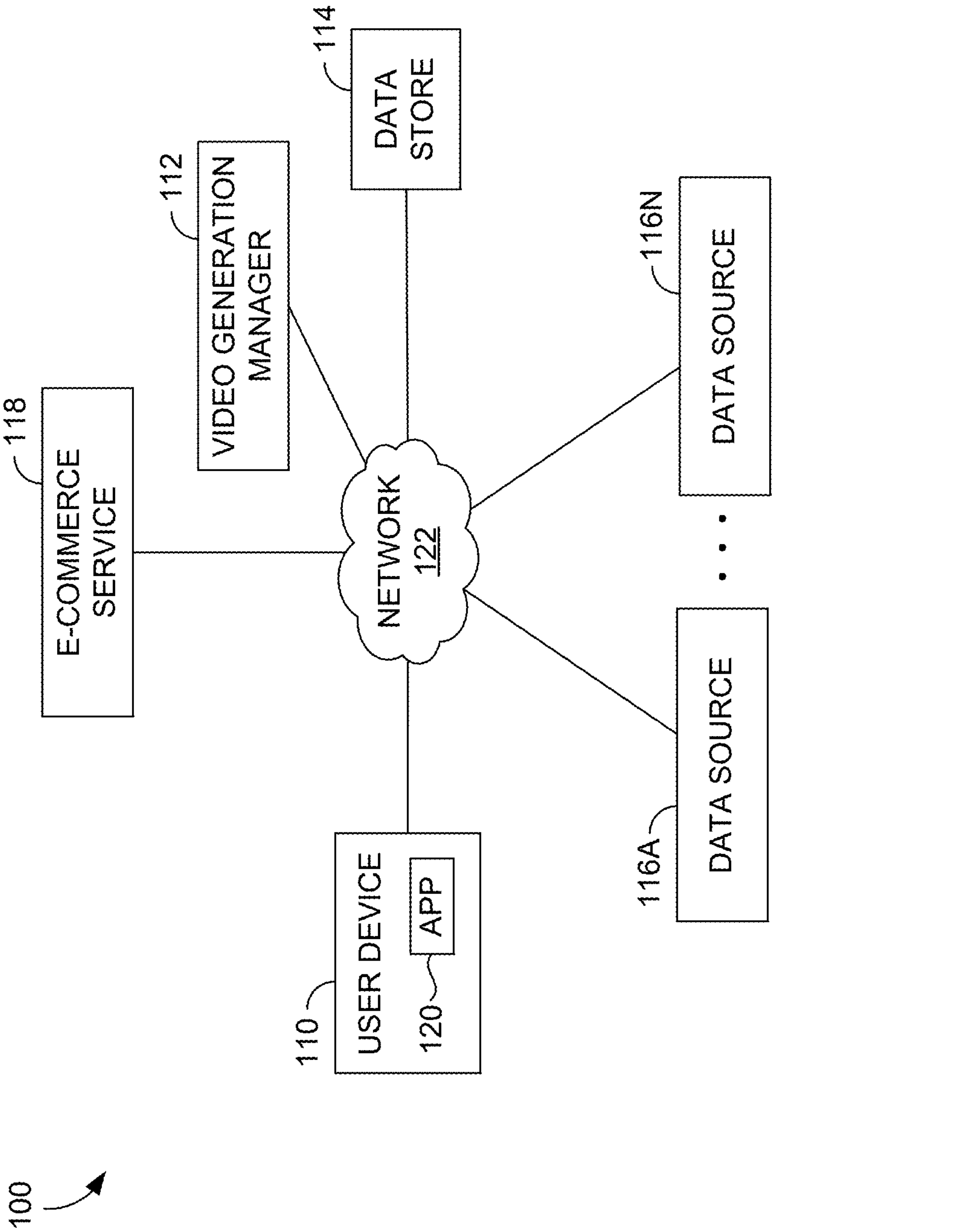
FIG. 1 is a block diagram of an exemplary system for facilitating optimized video generation, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Video content is oftentimes viewed to aid shoppers to better understand product offerings. By way of example, in presenting a product via an e-commerce service, various product details may be presented. Such product details may include text descriptions, consumer reviews, product images, and/or product videos. As such, a shopper may view the product video to obtain information about the product. For instance, a product video may provide product details that may not otherwise be provided in the text descriptions or product images. For instance, a product video may include details such as how the product is used, advantages of the product, and/or other details associated with the product that a shopper may value. In addition to facilitating purchasing of products, shoppers that view video content related to a product(s) may reduce returns by ensuring a best-suited product(s) is purchased.

In conventional approaches, the product videos provided for a shopper to view are static. That is, the product videos are the same for each shopper. In this regard, multiple shoppers having different interests are each presented with a same product video. Users, however, often have different interests and are searching for different types of information about a product or set of products. For instance, one shopper may be more interested in the color or size of a product, while another shopper may be interested in the quality or material of a product. In this regard, a product corresponding with an extensive number of attributes may have shoppers interested in various different attributes associated with the product. Further, shoppers have varied attention spans in consuming videos. Oftentimes, a shopper's attention span is short due to the overwhelming amount of information available on the internet. As such, it is increasingly important to grab and maintain user engagement with relevant information and media. Accordingly, presenting a same product video to different shoppers may not be of particular value to the different shoppers.

In addition to the decreased user experience in presenting static product videos, computing resources are also unnecessarily consumed to search for or identify desired product information. As one example, a shopper may use computing resources to view an entire product video and not identify the desired information. For instance, a shopper may continue to view a product video in an effort to view desired information that is not captured in the video. As another example, in cases in which a shopper does not identify desired information, the shopper may search for another product or continue searching for the desired information (e.g., using the ecommerce service or other applications or services, such as a search engine). In either case, additional computing resources are used to continue the search and/or view additional videos for information related to the product or another product. For instance, shoppers may generate and execute numerous search queries or access various product profiles to view products of interest, thereby consuming computing and network resources. For instance, computer input/output operations are unnecessarily increased in order for a consumer to identify a product when desired product details are inadequately represented. As one example, each time a search query is performed to identify a product with a specific attribute that a consumer is searching, the information of the search query must be located at a particular computer storage address of a storage device. The information must then be retrieved from the particular computer storage address of the storage device and presented to the consumer. The consumer must review the results of the search query to determine whether the search results reflect the desired product. As the consumer must perform multiple search queries when the desired product information is not identified, computing resources are unnecessarily used to repeat the process for multiple iterations in order to submit new and/or different search queries, along with the subsequent accessing, presentation, and review process of the product profiles and/or corresponding videos.

Accordingly, embodiments of the present technology are directed to efficient and effective generation of optimized videos, such as product videos, in a dynamic manner. In this regard, videos, such as product videos, are generated in a dynamic manner such that the video is tailored to interests and/or desires of a user to view the video. In particular, in embodiments, a video may be generated to include content and/or may be structured in a manner that is desired by the user. For example, a video associated with a product may be generated based on a user's search query and/or query intent, interaction data in the session, and the like. Such a video may be generated in near real-time, for instance, during a background process that executes during a shopper browsing session.

Advantageously, videos are adapted to interests of a user viewing the video, thereby resulting in a more desired video for the user. Dynamically generating a video desired to be viewed by a user facilitates providing more suitable or desired information to a user, thereby enhancing the value of the video to the user. For example, providing desired video content to a particular user can significantly improve consumer trust, product discoverability, and conversions, among other things. Further, providing a video that corresponds with an optimal duration or order of content may appropriately maintain user interest and provide the user with the desired information in an efficient manner.

In operation, to efficiently and effectively generate optimized videos, such as optimized product videos, various user data is obtained to customize or tailor the video in accordance with the user's desires and preferences. In this regard, video content (e.g., video assets) can be selected based on user preferences inferred from various user data, such as search queries, interaction data (e.g., previous interactions with an e-commerce service), and/or a user profile. Further, the order in which the content is presented may be selected based on inferred importance and relevance to the user (e.g., based on the various user data, such as search queries, interaction data, and/or user profile data). The order of content in the video can mitigate against the risk of abandonment of viewing the video and/or can capture a shopper's attention, for example, by presenting the most relevant information first. In addition, user preferences in relation to a video duration may additionally or alternatively be inferred to identify an optimal duration for the video. In this way, the video is adapted to a user's attention span and/or likelihood to engage with the video, for example.

To facilitate such dynamic video generation in a manner that is customized for a user viewing the video, in embodiments, generative video generation may be used. Such video content creation is performed as a function of the user search query, user interactions or browsing behavior, and inferred intent, among others. Advantageously, the dynamic video generation enables not only video content that is personalized for the particular user, but it is also variable (e.g., for a same user profile) based on the particular current intent of the user (e.g., what the user is currently interested in, as inferred based on current or recent input query(s) and/or interactions).

In embodiments, the obtained user data is used to identify and rank product assets. Product assets may include images, videos, text, etc. The ranked product assets may then be used to generate a video summary (e.g., a text summary) that summarizes aspects of interest to the user to view the video. In some cases, a large language model (LLM) may facilitate generation of the video summary based on an input prompt that includes an indication of ranked product assets. The video summary may be aggregated with an identified optimal duration in a new prompt that is input into a generative video model to generate a video. Accordingly, the video is generated in accordance with the video summary and the identified optimal duration for the user. As such, the generated video may include video content identified as relevant to the user, video content presented in an order that is optimal to the user, and/or a video duration that is optimal to the user.

Advantageously, generating optimized videos for a user to view the video in an automated manner reduces computing resources otherwise utilized to search for desired information. For example, content does not need to be unnecessarily downloaded and viewed to identify particular information about a product. As another example, computing resources used by a user to manually locate and review desired content are not needed. For instance, assume a user is generally interested in a particular product. Using embodiments described herein, an optimized video can be generated and presented that conveys information desired by the user such that the user does not need to search to identify more relevant or engaging information. In this way, a user is presented with video content that is optimized for the user (e.g., in content and format, such as content order and duration), thereby reducing the additional computing resources consumed with a user otherwise searching for such information (e.g., by performing additional searches and/or viewing additional videos).

Further, various embodiments take significantly less quantity of time to train and deploy in a production environment because the various embodiments can utilize a pretrained model. As such, embodiments described herein improve computing resource consumption, such as computer memory and latency, at least because not as much data (e.g., parameters) is stored or used for producing the model output and computational requirements otherwise needed for training are not needed.

Various terms and phrases are used throughout the description provided herein. A brief overview of such terms and phrases is provided here for ease of understanding, but more details of these terms and phrases are provided throughout.

A product asset generally refers to an asset or item that may be used to facilitate generation of a video, such as a product video. By way of example, a product asset may be an image, a video, text (e.g., text product description), metadata, combinations thereof, portions thereof, or the like associated with a product.

A video summary generally refers to a summary of a manner in which to generate a video. In this regard, a video summary may include an order of product assets that is suitable or desired to present to the user. In this way, a video summary is generated that is optimized for a user in a way that personalizes the video for the user, accounts for the query intent associated with the query, and provides the product assets in an order that corresponds with the user interests and desires.

An optimal video duration generally refers to a duration or length of time that is optimized or suitable for a particular user to view a video. An optimal video duration may be represented in any number of ways. As one example, an optimal video duration may be represented in a time unit or measure of time (e.g., seconds, minutes, etc.). As another example, an optimal video duration may be represented by ranges of times or other indicators of length. For instance, an optimal video duration may be represented as 15-30 seconds, or as a “short” video.

An optimized video generally refers to a video that is optimized for a particular user to view the video. The video may be optimized in any number of ways. In some cases, an optimized video may include content desired to be viewed by the user. In other cases, an optimized video may include content specific to a query input by the user. In yet other cases, an optimized video may include content ordered in a manner desirable to a user (e.g., the most relevant content at the beginning of the video). Additionally or alternatively, an optimized video may be of a length that is suitable to the user viewing the video. A video may be optimized for a viewer in any number or combination of ways and is not intended to be limited herein.

A generative video model generally refers to a deep learning model designed to create new video sequences from scratch or based on certain inputs or references (e.g., product assets, such as images, video clips, etc.). These models can generate dynamic, temporally coherent sequences that look like real videos. Generative video models leverage various advanced machine learning techniques to understand and replicate the complex spatial and temporal patterns present in video data.

Overview of Exemplary Environments for Facilitating Generation of Optimized Videos Referring initially to FIG. 1, a block diagram of an exemplary network environment 100 suitable for use in implementing embodiments described herein is shown. Generally, the system 100 illustrates an environment suitable for facilitating generation of optimized videos. In particular, videos are automatically generated in a manner that is optimal to a user to view the video. Among other things, embodiments described herein efficiently and dynamically generate videos that may be desired by the user to view the video. In embodiments, videos are generated in association with a product, also referred to as a product video. A product video refers to a video that is intended to describe, indicate, summarize, or promote a product or a set of products. At a high level, a video, such as a product video, may be generated in a manner that is optimized for the user viewing the video. As described herein, a video may be optimized in a number of ways. In one aspect, a video may be generated to be of an optimal length or duration. As another aspect, a video may be generated to be personalized to the user. In another aspect, a video may be generated to include assets that are relevant to a user’s current interest. In yet another aspect, an order of assets in a video may be optimized in accordance with a particular user viewing the video. Advantageously, generating and providing optimized videos enables a user (e.g., a viewer of a product video) to view a video in accordance with preferences and desires by the user without having to manually track down the desired data using various systems and queries thereto.

The network environment 100 includes user device 110, a video generation manager 112, a data store 114, data sources **116*a*-116*n* (referred to generally as data source(s) 116), and an e-commerce service 118. The user device 110, the video generation manager 112, the data store 114, the data sources 116*a*-116*n*, and e-commerce service 118 can communicate through a network 122**, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document, and nor should the exemplary network environment 100 be interpreted as having any dependency or requirement related to any single component or combination of components illustrated therein. For example, the user device 110 and data sources **116*a*-116*n* may be in communication with the video generation manager 112 and/or the e-commerce service 118 via a mobile network or the Internet, and the video generation manager 112 and/or e-commerce service 118 may be in communication with data store 114 via a local area network. Further, although the environment 100 is illustrated with a network, one or more of the components may directly communicate with one another, for example, via HDMI (high-definition multimedia interface) and DVI (digital visual interface). Alternatively, one or more components may be integrated with one another. For example, at least a portion of the video generation manager 112 and/or data store 114 may be integrated with the user device 110, data sources 116, and/or e-commerce service 118. For instance, a portion of the video generation manager 112 may be integrated with a user device, while another portion of the video generation manager 112 may be integrated with an e-commerce service 118**.

The user device 110 can be any kind of computing device capable of facilitating generation of optimized videos. In this regard, the user device 110 can facilitate automatically generating a video optimized for a user to view the video. For example, in an embodiment, the user device 110 can be a computing device such as computing device 800, as described above with reference to FIG. 8. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating generation of optimized videos (e.g., dynamically generating a product video optimized for a viewer of the video). In some implementations, the application(s) comprises a web application, which can run in a web browser, and could be hosted at least partially server-side (e.g., via a server). In addition, or instead, the application(s) can comprise a dedicated application. In some cases, the application is integrated into the operating system (e.g., as a service).

User device 110 can be a client device on a client-side of operating environment 100, while video generation manager 112 and/or e-commerce service 118 can be on a server-side of operating environment 100. Video generation manager 112 and/or e-commerce service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted that there is no requirement for each implementation that any combination of user device 110, video generation manager 112, and/or e-commerce service 118 must remain as separate entities.

In an embodiment, the user device 110 is separate and distinct from the video generation manager 112, the data store 114, the data sources 116, and the e-commerce service 118 illustrated in FIG. 1. In another embodiment, the user device 110 is integrated with one or more illustrated components. For instance, the user device 110 may incorporate functionality described in relation to the video generation manager 112 and/or e-commerce service 118. For clarity of explanation, embodiments are described herein in which the user device 110, the video generation manager 112, the data store 114, the data sources 116, and the e-commerce service 118 are separate, while understanding that this may not be the case in various configurations contemplated.

As described, a user device, such as user device 110, can facilitate generating videos optimized for a user to view the video via the user device. A user device 110, as described herein, is generally operated by an individual or entity that may initiate generation of a video(s) and/or that views the optimized video(s). In some cases, such an individual may be, or be associated with, an individual desiring to view information about a product. For instance, such an individual may be a person interested in, or a consumer of, a product(s). By way of example only, an individual may navigate to view a product (e.g., included as a search result via an e-commerce website). Based on navigating to view the product, and/or searching for the particular product, the user may be provided with various product data associated with the product. Such product data may include product details, product images, product reviews, and product videos, among other things. In this way, the user may be presented with a product video, associated with a product(s) of interest, that is dynamically generated in a manner that is optimized for the user such that the user can efficiently view information of interest.

In some cases, optimized video generation may be initiated at the user device 110. For example, in some cases, a user may directly or expressly select to generate or view a video related to a product. For instance, a user desiring to view product information associated with a product may specify a desire to view a product video associated therewith. As another example, a user may indirectly or implicitly select to generate or view a video related to a product. For instance, a user may navigate to an e-commerce store application or website. Based on the navigation to the e-commerce store application or website, the user may indirectly indicate to generate or view a product video(s) associated with a product(s). In some cases, such an indication may be based on generally navigating to the application or website. For instance, a product video may be requested for each product to be, or that may be, presented in the application or website. In other cases, such an indication may be based on selecting a particular product for which to view information or hovering over a particular product to indicate interest. In yet other cases, such an indication may be based on a user input query and/or one or more products resulting from the search query.

Generation of optimized videos may be initiated and/or presented via an application 120 operating on the user device 110. In this regard, the user device 110, via an application 120, might allow a user to initiate generation and/or presentation of optimized videos. The user device 110 can include any type of application and may be a standalone application, a mobile application, a web application, or the like. In some cases, the functionality described herein may be integrated directly with an application or may be an add-on, or plug-in, to an application. One example of an application that may be used to initiate and/or present optimized videos, such as product videos, includes any application in communication with an e-commerce service, such as e-commerce service 118. For example, initiating or viewing optimized product videos may occur via an e-commerce website or application operating on the user device that communicates with e-commerce service 118.

The user device 110 can communicate with the video generation manager 112 and/or other service, such as e-commerce service 118, to initiate generation or viewing of optimized videos, such as optimized product videos. In embodiments, for example, a user may utilize the user device 110 to initiate generation of an optimized video(s) via the network 122. For instance, in some embodiments, the network 122 might be the Internet, and the user device 110 interacts with the video generation manager 112 (e.g., directly or via another service such as the e-commerce service 118) to initiate generation of optimized videos. In other embodiments, for example, the network 122 might be an enterprise network associated with an organization. It should be apparent to those having skill in the relevant arts that any number of other implementation scenarios may be possible as well.

With continued reference to FIG. 1, the video generation manager 112 can be implemented as server systems, program modules, virtual machines, components of a server or servers, networks, and the like. At a high level, the video generation manager 112 manages generation of optimized videos, such as product videos. In particular, the video generation manager 112 can obtain various product assets and use such product assets to automatically generate a video relevant to the user. Such video generation is performed in real time such that as a user expresses interest in a product(s), a video is automatically generated and available to present to a user in accordance with the product. Generally, the video is generated in a manner that is optimized for the user to view the video. Such optimization may include content optimization, video length optimization, content structure optimization, and/or the like. In this regard, the particular content used to generate the video corresponds with a user's interests, and the structure or format of the content delivery corresponds with a user's preferences or intent. In operation, the video generation manager 112 may use a machine learning model, such as a large language model and/or generative video model, or another artificial intelligence model, to facilitate video generation. Using various data, the video generation manager 112 can generate a model prompt to initiate generation of an optimized video. As one example, a model prompt may include query intent data, user data, and/or product data. The model prompt can be input into a generative video model to obtain, as output, an optimized video (e.g., optimized product video). In some cases, data used as a basis for generating an optimized video may correspond to data provided via data sources 116. Data sources 116*a*-116*n* may be any type of computing devices at which content may be generated or stored. For example, product data, user data, and/or query intent data may be stored or created at data sources 116*a*-116*n*. For instance, as various users or consumers search for and select aspects associated with a product presented via an e-commerce service (e.g., e-commerce service 118), the data (e.g., clicks, product comparisons, purchases, questions, reviews, etc.) can be stored or communicated to data sources 116.

In accordance with generating an optimized video, the video generation manager 112 can provide or output such information to the user device 110 for presentation (e.g., via application 120). By way of example, assume a user of user device 110 is viewing a product or searching for a relevant product via application 120 operating on user device 110. In such a case, an optimized video is provided to the user device 110 for presentation (e.g., in association with a product).

In other cases, the video generation manager 112 outputs optimized videos to another service, such as an e-commerce service 118 or a product information management (PIM) service, or a data store, such as data store 114. For example, upon generating an optimized video, the video can be provided to e-commerce service 118, a PIM service, and/or data store 114 for subsequent use. For instance, when a user subsequently views a particular product via application 120 on user device 110, the optimized video may, in response, be provided to the user device. Any number of uses of such optimized videos may be implemented in accordance with embodiments described herein.

In embodiments, the video generation manager 112 communicates with or is a part of an e-commerce service. In this regard, in connection with managing various products and commercialization thereof, optimized videos can be generated in association with such products. In this way, optimized videos can be created and/or maintained within the context of the e-commerce service.

As described, the e-commerce service 118 may be any service that provides, presents, and/or sells products. To do so, the e-commerce service 118 can use product profiles that provide details associated with the products. In some cases, the e-commerce service 118 obtains a set of product profiles representing products. In some implementations, the product profiles may be generated via the e-commerce service. In other implementations, the product profiles may be generated via a PIM service. In accordance with obtaining the product profiles, the product profiles can be presented to consumers. In accordance with embodiments described herein, the product profiles presented may be enhanced product profiles. In particular, the product profiles may include or incorporate optimized videos in association with products. For example, assume a user is viewing details in association with a product. In such a case, the presented product profile may include an optimized video, or an option to view such a video.

As can be appreciated, in some cases, the video generation manager 112 may be a part of, or integrated with, the e-commerce service 118 and/or a PIM service. In this regard, the video generation manager 112 may function as a portion of the e-commerce service 118 or a PIM service. In other cases, the video generation manager 112 may be independent of, and separate from, the e-commerce service 118 and/or a PIM service. Any number of configurations may be used to implement aspects of embodiments described herein.

Advantageously, utilizing implementations described herein enables generation and presentation of videos, such as product videos, optimized in association with a user viewing the video. In particular, the content included in an optimized video corresponds with a user's interests. Further, the optimized video is structured in a manner that enables a user to view content in an efficient or optimal manner. As such, more relevant information for a user can be viewed, thereby facilitating more effective understanding of a product(s).

Figure 2:
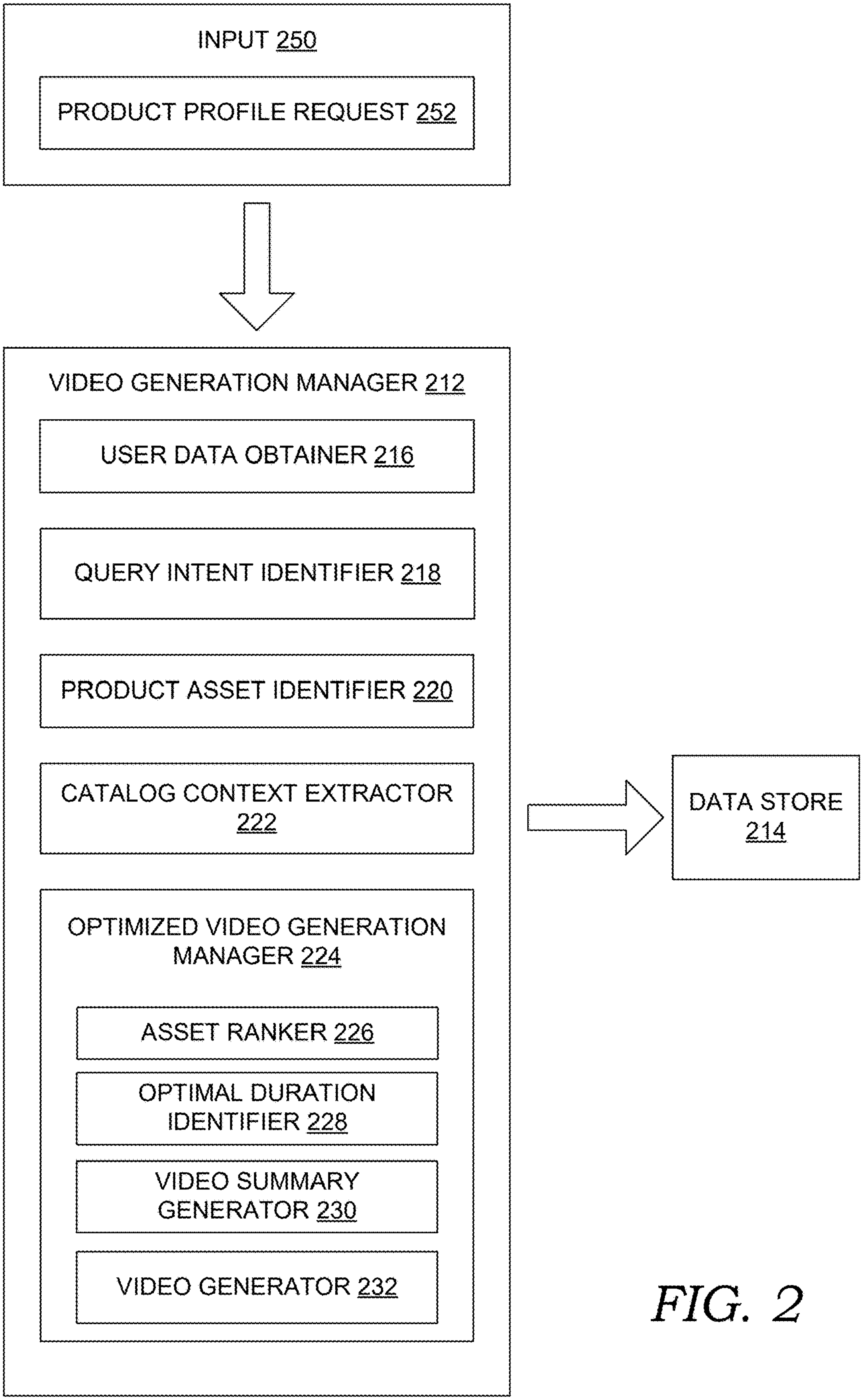
FIG. 2 is an example implementation for facilitating optimized video generation, in accordance with aspects of the technology described herein.

Turning now to FIG. 2, FIG. 2 illustrates an example implementation for generating optimized videos, for example, to enrich product information via video generation manager 212. The video generation manager 212 can communicate with the data store 214. The data store 214 is configured to store various types of information accessible by the video generation manager 212 or other server or service. In embodiments, user devices (such as user devices 110 of FIG. 1), data sources (such as data sources 116 of FIG. 1), an e-commerce service (such as e-commerce service 118 of FIG. 1), and/or servers or services can provide data to the data store 214 for storage, which may be retrieved or referenced by any such component. As such, the data store 214 may store product data, user data, query intent data, optimized videos, and/or the like. In this regard, data store 214 may store identified product data and user data, which can then be accessed for subsequent use to generate optimized videos.

In operation, the video generation manager 212 is generally configured to manage generation and/or provision of optimized videos, such as optimized product videos. In embodiments, the video generation manager 212 includes a user data obtainer 216, a query intent identifier 218, a product asset identifier 220, a catalog context extractor 222, and an optimized video generation manager 224. According to embodiments described herein, the video generation manager 212 can include any number of other components not illustrated. In some embodiments, one or more of the illustrated components 216-224 can be integrated into a single component or can be divided into a number of different components. Components 216-224 can be implemented on any number of machines and can be integrated, as desired, with any number of other functionalities or services.

The video generation manager 212 may receive input 250 to initiate generation and/or provision of an optimized video(s). Input 250 may include video generation request 252. A video generation request 252 generally includes a request or indication to generate an optimized video. In some cases, a video generation request may specify an indication of a product(s) for which a video is desired to be generated, an indication of a user for which to generate an optimized video, a query input by a user, and/or the like. Such data may be provided in any number of ways. For example, a product may be identified using a unique product identifier (e.g., a stock-keeping unit [SKU], a product identifier referenced in a catalog, etc.). A user may be identified using a unique user identifier, a user login and password, etc.

A video generation request 252 may be provided by any service or device. For example, in some cases, a video generation request 252 may be initiated and communicated via a user device, such as user device 110 of FIG. 1. For example, assume a user accesses a website or an application associated with one or more products (e.g., an e-commerce service used to generate and/or present products, or search therefrom). Further assume a user selects to view a product or performs a search for a product. In such a case, a video generation request 252 may be initiated that includes a request to generate a product video. For instance, in one example, the video generation request 252 may specify a product(s) for which an optimized product video is desired. Such a specification to generate an optimized product, or indicate a product, may be performed, for example, based on a search for a product, a selection of a particular product, etc. In some cases, a user may specifically or directly select to view a product video such that the user (e.g., product consumer) can view product information in the form of a video related to the product. For instance, a user may select a link to view a product video and, as such, a video generation request is generated and communicated to the video generation manager 212. As another example, generation of a particular product video may be specified based on a presentation of the product via the application or website, selection or other indication of interest in a product (e.g., a user pauses scrolling over the product or selecting the product to view), etc. As another example, a product video may be generated based on a query input. In this way, a new product video(s) may be generated based on an input query, or a modification thereof, such that the product video is dynamically generated in a manner that corresponds with a user intent or desires.

In other cases, a video generation request 252 may be automatically initiated and communicated via a user device or a service, such as e-commerce service 118 of FIG. 1. For example, a website or application service associated with products, such as an e-commerce service 118, may automatically initiate generation of videos associated with a product(s), for instance, based on a lapse of a time period a user views a product or searches for a product(s), or other criteria.

Although not illustrated, input 250 and/or video generation request 252 may include other information communicated in association with a video generation request. For example, user data (e.g., query data, interaction data, and/or profile data) may be provided in association with a video generation request. As another example, product data, such as a product identifier, may be provided in association with a video generation request. For instance, in some cases, a query input by a user to search for a product(s) may be communicated in association with a request to initiate generation of an optimized video.

The user data obtainer 216 is generally configured to obtain user data. User data generally refers to any data associated with a user. By way of example only, user data may include profile data, interaction data, and query data. Profile data, or user profile data, generally refers to any data associated with a user that is included in a user profile for the user. In embodiments, profile data may summarize a user in relation to an e-commerce service (e.g., a user history and preferences corresponding with the e-commerce service). Profile data may include demographics associated with a user, geographical data associated with a user, user preferences (e.g., as input by the user or automatically identified based on user interactions or feedback, etc.), a customer segment, etc. A customer segment may indicate a shopping segment associated with the user.

Interaction data, or user interaction data, generally refers to any data associated with a user interaction or set of interactions of the user. Interaction data enables an understanding of how a user interacts, for example, with an e-commerce service. In embodiments, user interaction data may refer to interactions or behaviors associated with an e-commerce service. In this regard, user interactions may include, for example, product selections, product purchases, product feature selections (e.g., selection of a product size, a product color, etc.), historical queries, etc. In some cases, interaction data may include all historical or previous data associated with a user interaction. In other cases, interaction data may correspond with a portion of historical or previous interactions. For example, interaction data may correspond with a particular user session or recent interaction data.

Query data generally refers to any data associated with a query. A query, or user query, may be input, selected, or otherwise provided by a user. In some cases, a query may be input by a user using a text box or chat box. In other cases, a query may be input via user selections, such as selections of features associated with a product(s). For example, as a user provides preferences for a product, such as size, manufacturer, color, etc., such selections may be included as query data obtained by the user data obtainer.

To obtain user data, the user data obtainer 216 generally obtains, references, or accesses various data. In some cases, the user data obtainer 216 obtains user data in accordance with obtaining a video generation request, such as video generation request 252. In this way, user data may be included in or correspond with a video generation request. For example, user data, such as query data, may be provided by a user device (e.g., in association with a video generation request 252 from the user device). To obtain query data, the user data obtainer 216 may obtain query data in association with a video generation request. Such query data may include a text input provided via a text box by a user at the user device (e.g., to a search system, a chat bot, a customer service representative, etc.). In other cases, query data may be input or provided based on selections by a user. For instance, in cases in which a user selects to filter on price, size, color, manufacturer, brand, or the like, such a user selection may be provided as, or part of, a query associated with a user.

Alternatively or additionally, user data may be accessed or obtained based on obtaining a video generation request. For instance, in response to obtaining a video generation request, relevant user data may be obtained via a data store or data source. In this regard, to obtain user profile data, such as profile data and/or interaction data (e.g., from a data store), the user data obtainer 216 may obtain user data based on a user identifier associated with a user. A user identifier may be obtained in any number of ways. For instance, a user identifier may be obtained based on a user session associated with the e-commerce service. As another example, a user identifier may be obtained in, or in association with, a video generation request. Based on the user identifier, corresponding user data (e.g., profile data and/or interaction data) may be accessed and obtained (e.g., via a data store). User data may be obtained from any number of sources, such as data sources 116 of FIG. 1, or data stores, such as data store 214. In this regard, the user data obtainer 216 may communicate with a data store(s) or other data source(s), including an e-commerce service (e.g., e-commerce service 118 of FIG. 1), and obtain various types of user data. Data store 214 illustrated in FIG. 2 may include such content, but any number of data stores and/or data sources may provide various types of content. Such data stores and data sources may include public data, private data, and/or the like.

In some cases, the user data obtainer 216 may obtain particular user data. For example, user interaction data may be obtained in association with a particular product, a particular type of product, within a particular time duration, and/or the like. As another example, user data, such as user interaction data, may be obtained in association with a time duration. In some cases, a predetermined time duration may be used to identify user data (e.g., user interaction data). For instance, historical user interaction data may be obtained in association with a particular time duration (e.g., one day, one week, one month, etc.). In other cases, historical user interaction data may be obtained in association with a current session of an e-commerce service. In yet other cases, a time duration may be dynamically determined. For instance, patterns of user behavior or interactions may be analyzed to identify a set of user interaction data to obtain. By way of example only, the user data obtainer 216 may analyze user interaction patterns and, in accordance with identifying a user focus on a particular product or product type, for instance, user interactions associated therewith may be obtained (e.g., within a user session or across sessions). As another example, recent history user interaction data may be determined or learned via a machine learning technique (e.g., supervised learning) that infers a time duration that is relevant to various types of queries and/or behavior interaction on an e-commerce website.

The query intent identifier 218 is generally configured to identify intent associated with queries. Query intent generally refers to a user intent that is determined or derived in association with a query. Query intent may indicate an intent indicating what a user desires to view or attain via the e-commerce service. In addition to analyzing query data (e.g., for a current query), query intent identifier 218 may use various user data to determine intent, such as user data obtained by user data obtainer 216. For instance, in one embodiment, the query intent identifier 218 may use user profile data and/or interaction data to identify query intent. As one example, the query intent identifier 218 may take, as input, a user search query as well as a continuous stream of user interaction data from interactions with the e-commerce service during the search and/or browsing session associated with the e-commerce service. Additionally or alternatively, the query intent identifier 218 may use profile data and/or other interaction data associated with prior sessions to identify query intent.

As can be appreciated, in some cases, query intent is dynamically updated as the query intent identifier 218 obtains additional data in association with a user. For example, as a user continues interactions with data in an e-commerce service or provides additional or modified queries, the new or updated user data may be obtained and used to update the query intent. In this way, an input stream of user data (e.g., real-time interaction data) in a current session may be used to update query intent in real time.

The product asset identifier 220 is generally configured to identify product assets. A product asset generally refers to an asset or item that may be used to facilitate generation of a video, such as a product video. By way of example, a product asset may be an image, a video, text (e.g., text product description), metadata, combinations thereof, portions thereof, or the like associated with a product. In this regard, the product asset identifier is configured to identify product assets that may be used to generate a product video. In this way, the product asset identifier 220 may identify product assets that are relevant to the user (e.g., based on query intent).

In embodiments, to identify product assets, the product asset identifier 220 may identify a product(s) for which to obtain or extract product assets. A product(s) may be identified in any number of ways. In one example, a product is identified in association with a video generation request. For instance, a video generation request may include an indication of a product of interest to the user (e.g., based on a user selection or a product being viewed by the user). In another example, a product is identified based on indication of a product in a query, a user interaction with a product listing, a viewing of a product, and/or the like. In yet another example, a product(s) may be inferred, for instance, using a machine learning model or other artificial intelligence technology. For example, a prompt that includes the identified query intent may be generated and input into an LLM and, in response, the LLM may provide an inferred product(s) of interest. In some cases, the prompt may include contextual data to facilitate identification of a product of interest. For instance, the prompt may include product data associated with a set of products (e.g., from a product catalog). Additionally or alternatively, the LLM may be fine-tuned using product data (e.g., from a product catalog). As can be appreciated, any number of products may be identified as relevant. For example, a particular product being viewed may be identified. In another example, multiple products being compared to one another or being analyzed together may be identified.

In accordance with identifying a relevant product, a set of product assets associated with the identified product(s) may be identified. In this way, the product asset identifier 220 may identify product assets associated with the relevant product(s). In some cases, the product assets, or indications thereof, may be identified using a product catalog that includes or references various product assets. For example, based on an identified relevant product, product assets identified via a product catalog may be identified. Any other data source indicating or storing product assets may be used to identify product assets.

Further, any number of product assets associated with a relevant product may be identified. For instance, in some cases, each product asset associated with a relevant product may be identified. In other cases, a portion of the product assets associated with a relevant product may be identified. For example, a portion of product assets identified as relevant may be identified (e.g., using an algorithm, machine learning, an LLM, etc.). In some cases, product assets may be identified as relevant based on, for example, the identified query intent. In this way, product assets are obtained or extracted for a set of intent-relevant products. That is, based on identified intent associated with a query, product assets relevant thereto may be identified, for example, via a product catalog.

In embodiments, to identify product assets relevant to query intent, a search and retrieval implementation may be used (e.g., a portion of a retrieval-augmented generation (RAG) approach). At a high-level, RAG is intended to improve performance of language models by incorporating external information retrieved from a knowledge base or documents. RAG includes two aspects, one of which is the retriever aspect. A retriever approach is responsible for fetching relevant information from a large corpus or database, generally most relevant to an input query. In performing a retrieval aspect in accordance with embodiments described herein, a set of relevant product assets may be searched or identified based on the query data and/or query intent. For example, relevant product assets may be identified via a product catalog using an inferred intent associated with a user query. Such a process may use various methods to identify relevant data (e.g., TF-IDF or advanced neural methods using embeddings to capture semantic similarity). Further, in embodiments, user data (e.g., user profile data, user interaction data, etc.) and/or catalog context data may be used to identify relevant product assets.

One example implementation of relevant product asset identification may include aggregating product assets associated with a particular product and chunking or segmenting the product assets (e.g., into smaller portions, such as paragraphs or sections, of a larger document). The chunked product assets may be embedded into an embedding space and represented in a vector index or database. In accordance with obtaining a query (e.g., including query intent), the index or database may be searched to identify relevant product assets.

In embodiments, the retrieval process includes generating scores in association with the relevant product assets. For example, BM25 scores or similarity scores may be generated in association with identified product assets. In some cases, a subset of the highest-ranked product assets may be selected to be communicated, for example, in association with the generative content optimizer. In some cases, the product asset identifier 220 may rank the product assets based on the corresponding scores.

In another example approach to identifying relevant product assets, an LLM may be used. For example, a prompt may be input into an LLM that includes the identified query intent and product, and the LLM may, in response, provide an inferred product asset(s) that is relevant to the inferred intent. In some cases, the prompt may include contextual data including the product data (e.g., from a product catalog). Additionally or alternatively, the LLM may be fine-tuned using product data (e.g., from a product catalog). As can be appreciated, any number of product assets may be identified as relevant.

The catalog context extractor 222 is generally configured to extract context associated with the catalog. In this way, the catalog context extractor 222 extracts metadata associated with a product catalog. As described, the product catalog includes a variety of products. The product catalog may include various data or information associated with the products in the product catalog. For example, the product catalog may include product assets, or references thereto, associated with the products (e.g., manuals, links, blog posts, images, videos, etc.). Catalog context generally refers to metadata associated with the product catalog. For example, catalog context may indicate an industrial catalog or B2B catalog. In embodiments, catalog content provides information associated with the catalog that is not product-specific information. As described herein, catalog context may be used to facilitate generation of a product video. For instance, catalog context may be included in a prompt to an LLM to enhance the LLM's understanding of the product catalog.

The optimized video generation manager 224 is generally configured to manage generation of optimized videos, such as product videos. At a high level, in one embodiment, the optimization video generation manager 224 facilitates generation of optimized videos using a machine learning model (s), such as an LLM and/or generative video model, along with data obtained or derived via the video generation manager 212 to dynamically generate a video that is relevant to the user to view the video. In particular, product assets identified as relevant to a user (e.g., based on query intent) may be used to generate a product video to present to the user.

The optimized video generation manager 224 may include any number of components to facilitate generation of optimized videos. In one embodiment, as shown in FIG. 2, the optimized video generation manager 224 may include an asset ranker 226, an optimal duration identifier 228, a video summary generator 230, and a video generator 232. Any number of components may be used to perform the functionality described herein and is not intended to be limited to the structure provided herein.

The asset ranker 226 is generally configured to rank product assets, such as product assets identified as relevant via the product asset identifier 220. In some embodiments, the asset ranker 226 may rank product assets based on scores, for example, generated via a retrieval component of RAG performed via the product asset identifier 220. In other embodiments, the asset ranker 226 may perform asset ranking via another approach. For example, the asset ranker 226 may rank product assets using various user data and/or an identified query intent. In this way, for instance, user profile data and an identified query intent may be input into the asset ranker 226 along with a set of product assets to rank the product assets based on relevance to the user. Product catalog context may additionally or alternatively be used by the asset ranker 226 to rank the product assets. Such an asset ranking may be performed to initially rank product assets or to re-rank product assets (e.g., product assets previously ranked by the product asset identifier 220).

An optimal duration identifier 228 is generally configured to identify or predict an optimal duration of a video generated. In particular, the optimal duration identifier 228 may identify an optimal duration for the particular user. For example, one user may have more interest or tolerance to view a longer video, while another user may not watch a video, or may terminate a video, if too long in duration.

Identifying an optimal duration for a particular user to view a video may be detected or determined in any number of ways. In this regard, any type of technology may be used to identify optimal duration for a user. As one example, a supervised learning mechanism based on historical abandonment rates and rates of user engagement with content that led to a conversion(s) may be used. In this way, prior video interaction for a user may be used to identify a suitable or optimal duration of a video to present to the user. In some cases, user data on content engagement and abandonment may be augmented with cumulative average behavioral trends based on collective shopper behavior on an e-commerce site. In some cases, such a supervised predictive model may be trained and/or deployed in an offline manner.

The optimal duration identifier 228 may use any type of data to identify an optimal duration for a video for a particular user. For example, user data, such as a user profile, historical user engagement of video, etc., and query intent may be used to identify an optimal duration for a video. In some cases, optimal durations may be of any value or range. In other cases, optimal duration may be of discrete values or ranges. For example, a video duration of a short video length (e.g., 15 seconds), a medium video length (e.g., 30 seconds), and a long video length (e.g., 60 seconds) may be candidate video durations to use to identify an optimal video duration. In some cases, an initially identified duration may be fine-tuned based on a metric (e.g., video engagement or conversion likelihood).

The video summary generator 230 is generally configured to generate a video summary. A video summary generally refers to a summary of a manner in which to generate a video. In this regard, a video summary may include an order of product assets that is suitable or desired to present to the user. In this way, a video summary is generated that is optimized for a user in a way that personalizes the video for the user, accounts for the query intent associated with the query, and provides the product assets in an order that corresponds with the user interests and desires.

A video summary may be generated in any number of ways and using any types of technology. In one example, a video summary is generated using a machine learning approach, such as, for example, an LLM. In this regard, the video summary generator 230 may generate a video summary prompt. A video summary prompt refers to a prompt that is generated to input to an LLM to obtain, as a result, a video summary. The video summary prompt may generally include an instruction to generate a video summary relevant for the user. In this way, the video summary prompt may specify to generate a video summary that includes the most valued aspects to include in a generated video for the user and in what order such information should be presented. For example, a video summary prompt may specify to generate a video summary that presents video assets in a manner that most resonates with a user's intent. In addition to providing an instruction, the video summary prompt may include a ranked list of product assets (e.g., as ranked via an asset ranker 226). Additional information data may also be included in a video summary prompt, such as query intent, user data (e.g., user profile data, user interactions, etc.), catalog context, etc.

In addition, a model prompt may also include output attributes. Output attributes generally indicate desired aspects associated with an output, such as a video summary. For example, an output attribute may indicate a target temperature to be associated with the output. A temperature refers to a hyperparameter used to control the randomness of predictions. Generally, a low temperature makes the model more confident, while a higher temperature makes the model less confident. Stated differently, a higher temperature can result in more random output, which can be considered more creative. On the other hand, a lower temperature generally results in a more deterministic and focused output. A temperature may be a default value, a value based on user input, or a determined value. As another example, an output attribute may indicate a length of output. For example, a model prompt may include an instruction for a desired length of a video summary. As another example, a model prompt may include an instruction for a maximum number of characters or a target range of characters. As another example, an output attribute may indicate a target language for generating the output. For example, the text data may be provided in one language, and an output attribute may indicate to generate the output in another language. Any other instructions indicating a desired output is contemplated within embodiments of the present technology.

The video summary generator 230 may be or include any number of machine learning models or technologies. In some embodiments, the video summary generator 230 may include, or access, an LLM that takes, as input, the video summary prompt and provides, as output, a video summary. A language model is a statistical and probabilistic tool which determines the probability of a given sequence of words occurring in a sentence (e.g., via NSP or MLM). In this way, it is a tool that is trained to predict the next word in a sentence. A language model is called a large language model when it is trained on an enormous amount of data. Some examples of LLMs are OPT, FLAN-T5, BART, GOOGLE's BERT, and OpenAI's GPT-2, GPT-3, and GPT-4. For instance, GPT-3, is a large language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text. In embodiments, an LLM generates representations of text, acquires world knowledge, and/or develops generative capabilities. As described, in some embodiments, the video summary generator 230 takes on the form of an LLM, but various other machine learning models can additionally or alternatively be used.

In embodiments, the video summary generator 230 is fine-tuned. Fine-tuning generally refers to the process of retraining a pre-trained model on a new dataset without training from scratch. Fine-tuning typically takes weights of a trained model and uses those weights as the initialization value, which is then adjusted during fine-tuning based on the new dataset. Fine-tuning can be used in cases in which an industry-specific data set exists that can be used to fine-tune the model. In some implementations, the LLM is fine-tuned on various video summaries to leverage its text generation ability in association with video summaries.

The video summary generated by an LLM may take on any number of forms. As one example, the video summary may include text that summarizes a product or product assets in a way that resonates with a particular user (e.g., in a manner that highlights or focuses on a product feature of interest or other aspect corresponding with a query intent). As another example, a video summary may include a storyline described in text that corresponds with various product assets in a particular order. In this way, the product assets may be re-ranked in a particular order to correspond with a desired intent or flow for a product video. For example, a product feature most desired by a user may be presented in the initial portion of the product video. As can be appreciated, a video summary generated for one user or in association with one query intent may have a different set of product assets and/or an order of product assets that is different from a video summary generated for another user or in association with another query intent.

The video generator 232 is generally configured to generate an optimized video for a user. In this regard, the video is dynamically generated in a manner that is desirable to the user viewing the video. An optimized video may be generated in any number of ways and using any type(s) of technology. In one example, an optimized video is generated using a machine learning approach, such as, for example, a generative video model. In this regard, the video generator 232 may generate a video generation prompt. A video generation prompt refers to a prompt that is generated to input to a machine learning model to obtain, as a result, a video. The video generation prompt may generally include an instruction to generate a video relevant for the user. In this way, the video generation prompt may specify to generate a video in association with user preferences or desires. For example, a video generation prompt may specify to generate a video that presents video assets in a manner that most resonates with a user's intent and in association with a time duration that is suitable to the user. In addition to providing an instruction, the video generation prompt may include the video presentation summary (e.g., as generated via video summary generator 230). Additional information data may also be included in a video generation prompt, such as query intent, user data (e.g., user profile data, user interactions, etc.), catalog context, etc. Further, in embodiments, the video generation prompt may include or be associated with product assets and/or an optimal duration for the video. For example, the video generation prompt may also include the identified optimal duration such that the video is generated in accordance with the time duration identified as optimal for the user viewing the video. As another example, the video generation prompt may include product assets, for example, referenced in the video presentation summary for use in generating the video. Such product assets may include textual assets, visual assets, etc. In some cases, the product assets may correspond with various products (e.g., a ranked list of products).

The video generator 232 may include, or access, a machine learning model that takes, as input, the video generation prompt and provides, as output, a video. As one example, the video generator 232 may include, or access, a generative video model. A generative video model generally refers to a deep learning model designed to create new video sequences from scratch or based on certain inputs or references (e.g., product assets, such as images, video clips, etc.). These models can generate dynamic, temporally coherent sequences that look like real videos. Generative video models leverage various advanced machine learning techniques to understand and replicate the complex spatial and temporal patterns present in video data. Such advanced machine learning techniques may include, for example, generative adversarial networks (GANs), variational autoencoders (VAEs), recurrent neural networks (RNNs) and long short-term memory (LSTM) networks, transformers, diffusion models, etc.

The video generated using artificial intelligence technology, such as a generative video model, may take on any number of forms and is not intended to be limited herein. Generally, the video generated corresponds or complies with the optimal duration identified for the video. In this way, a product video is generated to be approximately a same length (or less) than an identified optimal duration identified for the user viewing the video.

The generated video may be provided or output by the video generation manager 212. In some examples, the generated video may be provided for display to the user via the user device. For instance, in response to a selection to view a product video, the generated product video may be output to the user device for display via a user interface (e.g., in association with an e-commerce service). To this end, in cases in which the video generation manager 212 is remote from the user device, the video generator 232 may provide an optimized video(s) to a user device for display to a user interested in the product(s). Alternatively or additionally, the generated video may be provided for storage, such as via the data store 214, to store for subsequent viewing, or to another component or service, such as an e-commerce service (e.g., e-commerce service 118 of FIG. 1). Such a component or service may then provide the optimized video(s) for display, for example, via a user device. For instance, in some cases, optimized product videos may be generated in a periodic manner. As one example, optimized product videos may be generated in off-hours (hours in which computing resources are more available and not used by other processes). Such optimized product videos can then be stored, for example, in data store 214. Thereafter, assume a user navigates, via a user device, to a website or application providing various products. In association with navigating to the website/application, or a particular product associated therewith, a service can access an appropriate product video (e.g., corresponding to the particular product) and provide the optimized product video for display in association with the corresponding product.

In embodiments, the user interface enables a user to provide feedback. In this regard, in accordance with presenting an optimized video, such as a product video, an option for providing feedback can also be presented. For example, thumbs-up (to approve the video) and thumbs-down (to reject the video) icons can be presented for receiving a user selection. Additionally or alternatively, feedback can be provided to modify the optimized video. For example, a user may indicate a desired duration to be longer or shorter. As another example, a user may indicate a portion of the video deemed most desirable or relevant to the user. As a user selects or provides input regarding an optimized video, the feedback is captured. Such feedback can be used to update the optimized video or for generating more relevant or desirable subsequent optimized videos (e.g., associated with a different product).

Figure 3:
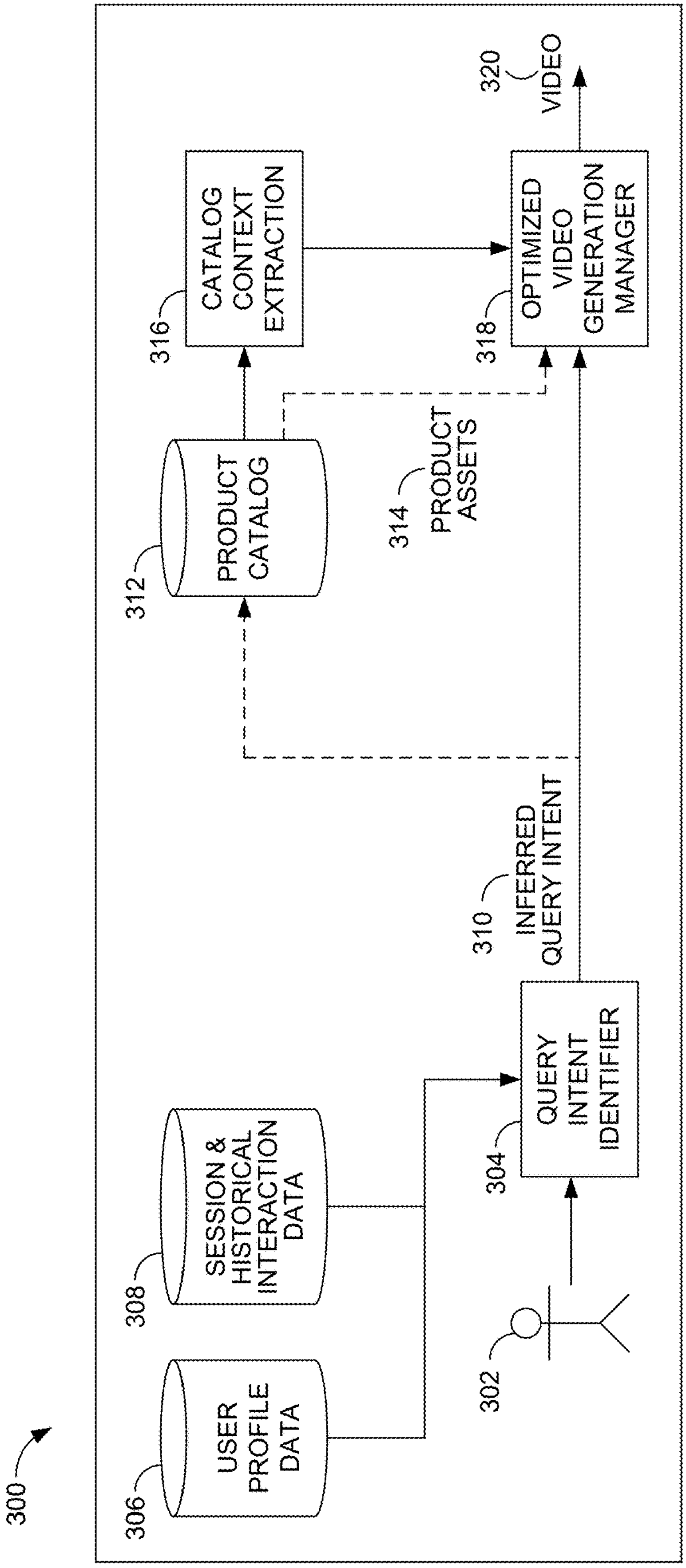
FIG. 3 provides an example implementation for facilitating optimized video generation, in accordance with embodiments of the present technology.

Exemplary Implementations for Generating Product Profile Recommendations and Quality Indicators to Enhance Product Profiles FIG. 3 provides an example implementation 300 for generating an optimized video 320 for a user 302. In particular, as shown in FIG. 3, the video generated is a product video, however, such an implementation may be performed in a similar manner to generate optimized videos with other content. In accordance with user input from user 302, user profile data 306, and/or session and historical interaction data 308, the query intent identifier 204 may generate an inferred query intent 310. The inferred query intent 310 may be used in association with the product catalog 312 to identify a set of product assets 314 that are relevant to the query intent 310. For instance, assume a particular product is identified to be of interest. In such a case, product assets associated with the product catalog 312 can be identified and provided to the optimized video generation manager 318. In some cases, the product assets are identified based on their relevance to the query intent 310. The catalog context extractor 316 may also extract or identify catalog context, which can be provided to the optimized video generation manager 318. The optimized video generation manager 318 takes such inputs and generates an optimized video 320.

Figure 4:
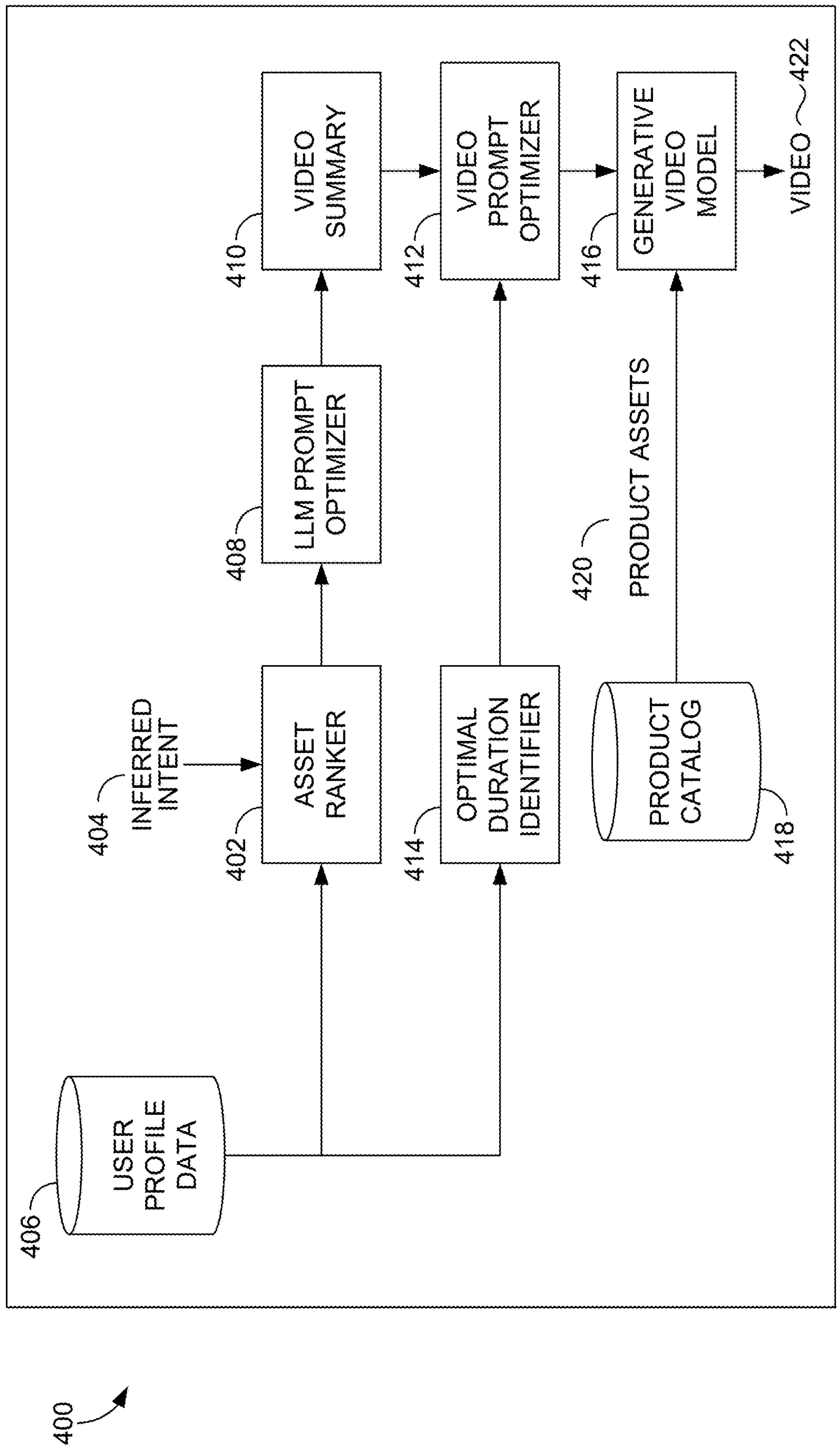
FIG. 4 provides another example implementation for facilitating optimized video generation, in accordance with embodiments of the present technology.

Turning to FIG. 4, FIG. 4 provides an example implementation 400 for generating an optimized video for a user. In particular, as shown in FIG. 4, a set of product assets (e.g., associated with product catalog 418) may be ranked via asset ranker 402. As shown, the product assets may be ranked based on inferred intent 404 and user profile data 406. The ranked product assets may then be provided to an LLM prompt optimizer 408 that generates a prompt for inputting into an LLM to generate a video summary 410. Although not illustrated, the LLM prompt optimizer 408 may provide various other data in the prompt to generate a video summary. For example, query intent 404, user interaction data, user profile data 406, product data from product catalog 418, and/or the like may be used to facilitate generating the prompt for the LLM. In accordance with providing as input the prompt to an LLM, a video summary 410 may be provided as output. The video summary 410 may be used by the video prompt optimizer 412 to generate a video prompt for the generative video model 416. In this way, the video prompt optimizer 412 generates a video prompt that includes the video summary. The video prompt may also include an indication of an optimal duration for the video. An optimal duration for the video may be generated via optimal duration identifier 414, which may use user profile data 406, among other things, to identify an optimal duration for the user to view the video 422. The video prompt may then be provided to a generative video model 416 that generates the video 422. The generative video model 416 may use product assets 420 from the product catalog 418 to generate the video 422. For example, the video prompt may indicate or reference a number of product assets to use for generating the video 422. As such, the generative video model 416 may access such product assets via product catalog 418 to facilitate generation of the video 422.

Figure 5:
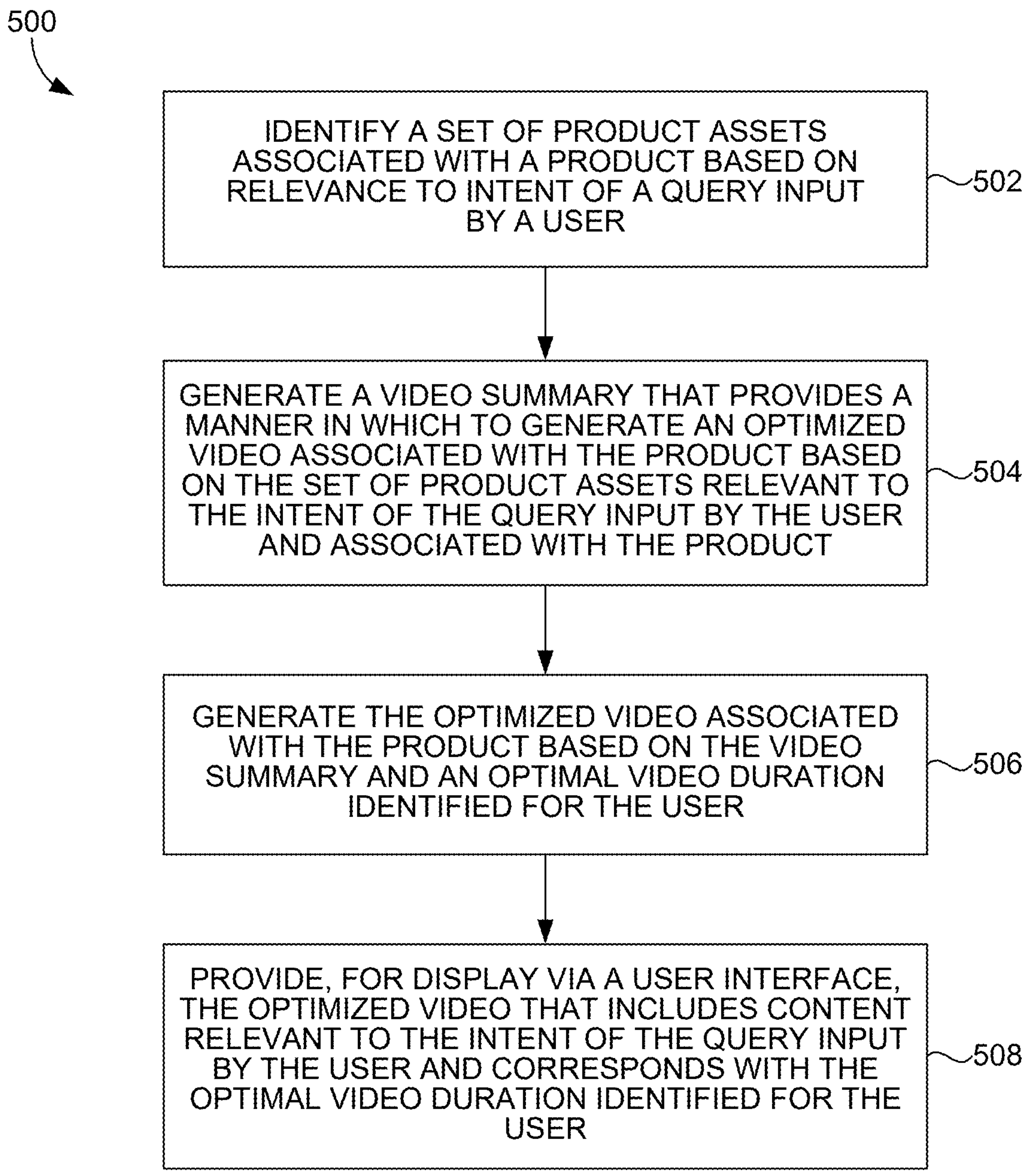
FIG. 5 provides an example method for generating optimized videos, in accordance with embodiments of the present technology.
Figure 6:
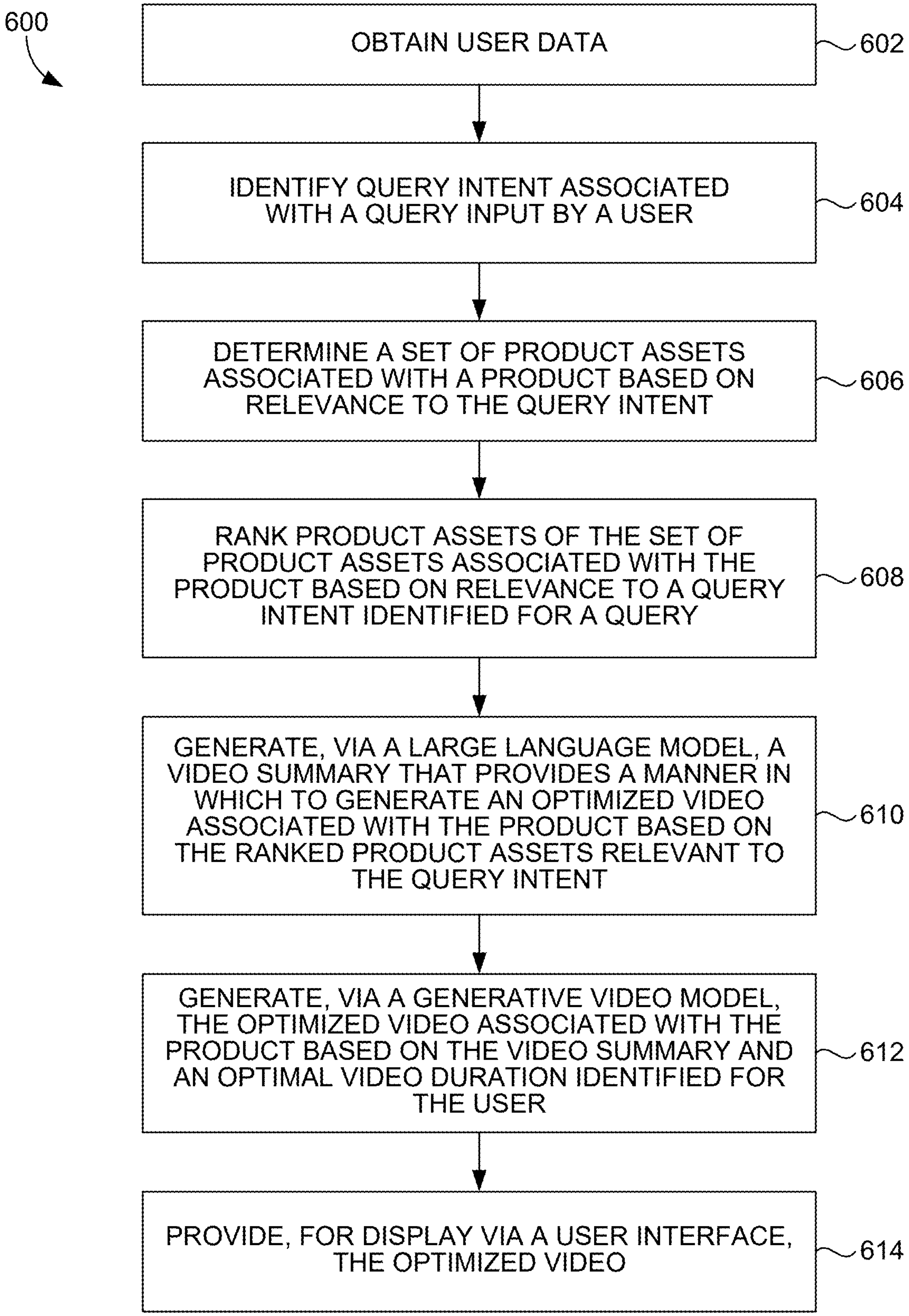
FIG. 6 provides another example method for generating optimized videos, in accordance with aspects of the technology described herein.
Figure 7:
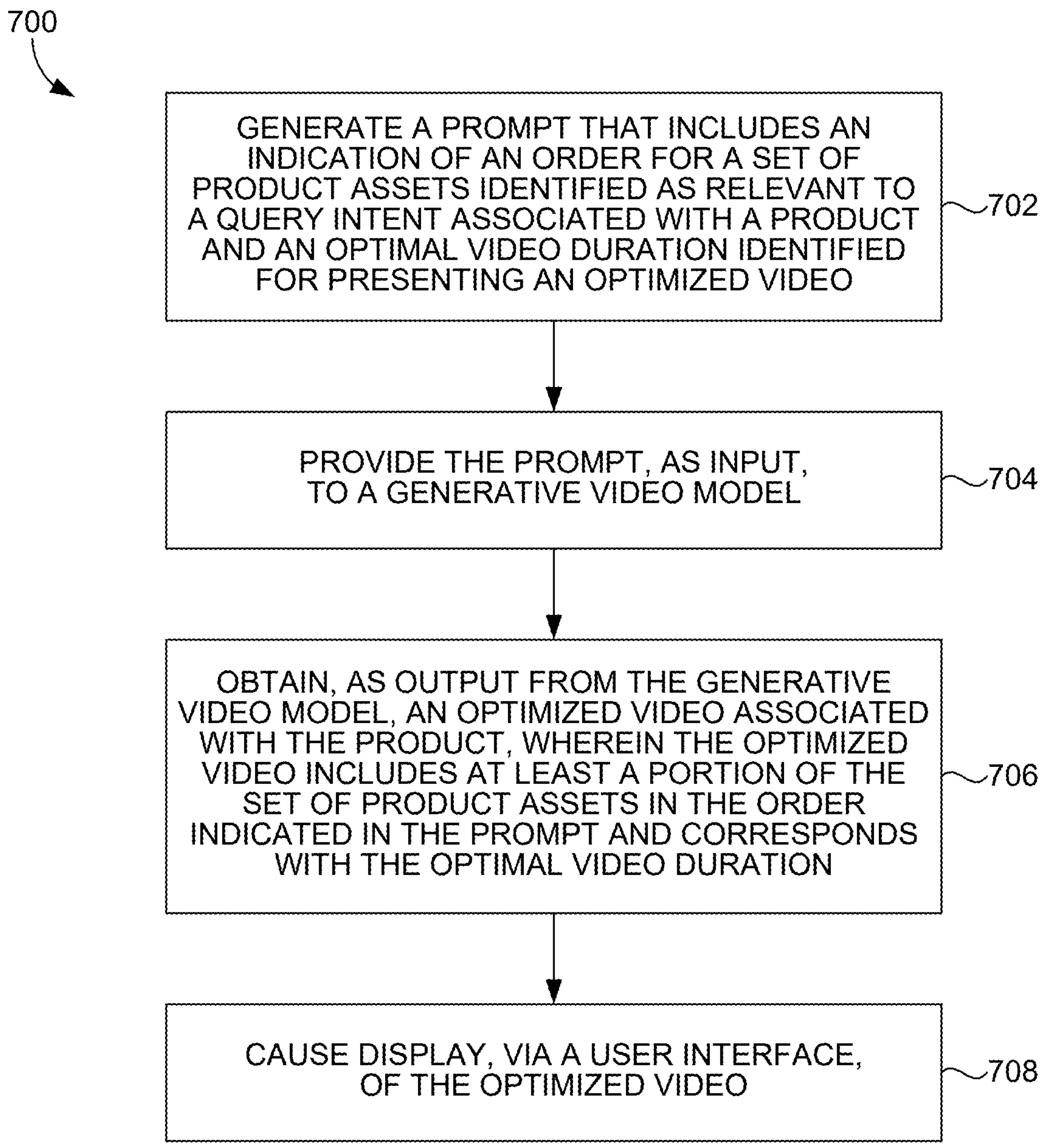
FIG. 7 provides another example method for generating optimized videos, in accordance with aspects of the technology described herein.

As described, various implementations can be used in accordance with embodiments described herein. FIGS. 5-7 provide methods of dynamic generation of optimized videos, such as product videos, in accordance with embodiments described herein. Methods 500, 600, and 700 can be performed by a computer device, such as device 800 described below. The flow diagrams represented in FIGS. 5-7 are intended to be exemplary in nature and not limiting.

Turning initially to method 500 of FIG. 5, method 500 is directed to facilitating generation of an optimized video, in accordance with embodiments of the present technology. Initially, at block 502, a set of product assets associated with a product based on relevance to the intent of a query input by a user is identified. The set of product assets may be a ranked set of product assets based on relevance to the intent of the query input by the user. In embodiments, the set of product assets are identified as relevant to the intent of the query using a retrieval process (e.g., as part of RAG). In embodiments, query intent may be inferred using the query input by the user and user interaction data.

At block 504, a video summary that provides a manner in which to generate an optimized video associated with the product is generated based on the set of product assets relevant to the intent of the query input by the user and associated with the product. In embodiments, the video summary includes a text summary indicating an order of product assets for generating the optimized video. Various other types of data may be used to generate an optimized video. As one example, catalog context may be identified and used to generate the video summary (e.g., included in the prompt). A video summary may be generated using an LLM. In this regard, an LLM may take, as input, a prompt including an indication of the set of product assets relevant to the intent of the query and an indication of the intent of the query input by the user.

At block 506, the optimized video associated with the product is generated based on the video summary and an optimal video duration identified for the user. In one embodiment, the optimized video is generated using a generative video model that takes, as input, a prompt including the video summary and the optimal video duration identified for the user. The optimal video duration for the user may be identified using user profile data and/or inferred query intent. In some case, a predictive model trained using historical video engagement may be used to identify the optimal video duration for the user.

At block 508, the optimized video is provided for display. In embodiments, the optimized video includes content relevant to the intent of the query input by the user and that corresponds with the optimal video duration identified for the user.

With reference to method 600 of FIG. 6, method 600 is directed to facilitating generation of optimized videos, in accordance with embodiments of the present technology. Initially, at block 602, user data is obtained.

At block 604, query intent associated with a query input by a user is identified. Query intent may be identified in any number of ways, including using user interaction data.

At block 606, a set of product assets associated with a product is determined based on relevance to the query intent. In this way, a product catalog may be accessed to identify product assets associated or relevant to a product, in particular, based on a user input query. In some embodiments, a retrieval process and/or an LLM may be used to identify relevant product assets.

At block 608, product assets are ranked based on relevance to a query intent identified for the query. In some cases, product assets are ranked based on user profile data and data associated with a product catalog.

At block 610, a video summary is generated, via a large language model, that provides a manner in which to generate an optimized video associated with the product based on the ranked product assets relevant to the query intent. In some cases, the video summary includes an order for the ranked product assets to appear in the optimized video. The video summary may include additional information such as an indication of product assets or content of greater relevance to the user.

At block 612, the optimized video is generated, via a generative video model, based on the video summary and an optimal video duration identified for the user. An optimal video duration may be identified in any number of ways. As one example, an optimal video duration for a user may be identified via supervised learning based on historical video abandonment rates and/or user engagement rates with video content associated with conversions.

At block 614, the optimized video is provided for display. In this way, a user may view the video that is tailored or customized for the user (e.g., in terms of content and duration).

Turning now to method 700 of FIG. 7, method 700 is directed to facilitating generation of optimized videos, in accordance with embodiments described herein. Initially, at block 702, a prompt is generated that includes an indication of an order for a set of product assets identified as relevant to a query intent associated with a product and an optimal video duration identified for presenting an optimized video. The prompt may include various other types of data, such as query intent, product catalog context, set of user profile data, the query, set of product data, etc. Query intent may be identified, for example, based on a query input by a user.

At block 704, the prompt is provided, as input, to a generative video model. Thereafter, at block 706, an optimized video is obtained as output from the generative video model. The optimized video includes at least a portion of the set of product assets in the order indicated in the prompt and that corresponds with the optimal video duration. Such product assets may include an image, a video, a text description and/or the like. At block, 708, the optimized video is caused to be displayed via a user interface.

Accordingly, we have described various aspects of technology directed to systems, methods, and graphical user interfaces for intelligently generating optimized videos, such as product videos. It is understood that various features, subcombinations, and modifications of the embodiments described herein are of utility and may be employed in other embodiments without reference to other features or subcombinations. Moreover, the order and sequences of steps shown in the example methods 500, 600, and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 8:
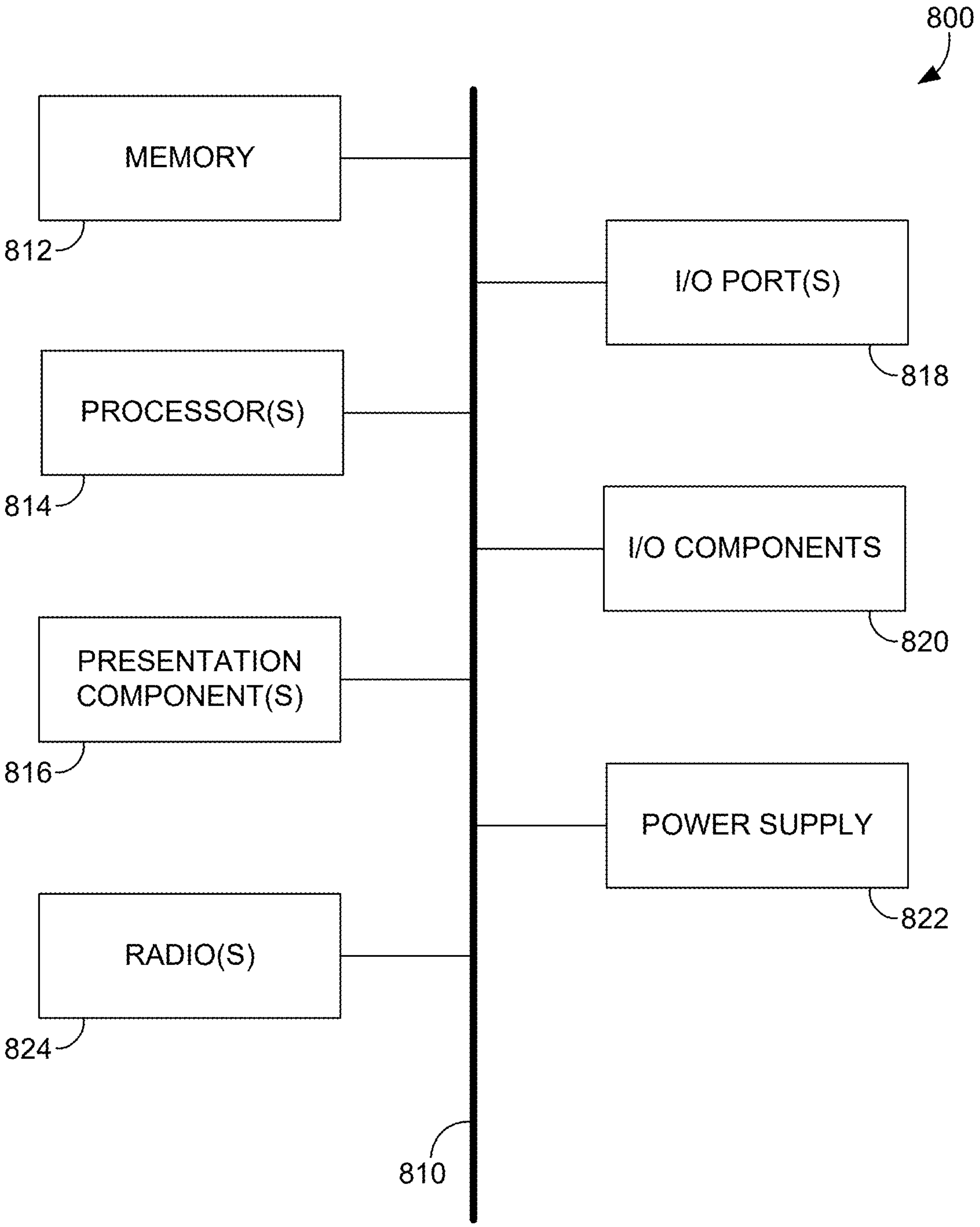
FIG. 8 is a block diagram of an exemplary computing environment suitable for use in implementing aspects of the technology described herein.

Referring to the drawings in general, and to FIG. 8 in particular, an exemplary operating environment for implementing aspects of the technology described herein is shown and designated generally as computing device 800. Computing device 800 is just one example of a suitable computing environment and is not intended to suggest any limitation as to the scope of use or functionality of the technology described herein, and nor should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, an illustrative power supply 822, and a radio(s) 824. Bus 810 represents what may be one or more buses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor hereof recognizes that such is the nature of the art, and reiterate that the diagram of FIG. 8 is merely illustrative of an exemplary computing device that can be used in connection with one or more aspects of the technology described herein. Distinction is not made between such categories as "workstation," "server," "laptop," and "handheld device," as all are contemplated within the scope of FIG. 8 and refer to "computer" or "computing device."

Computing device 800 typically includes a variety of computer-readable media. Computer-readable media can be any available media that can be accessed by computing device 800 and includes both volatile and non-volatile, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVDs) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or non-volatile memory. The memory 812 may be removable, non-removable, or a combination thereof. Exemplary memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, and vibrating component. I/O port(s) 818 allow computing device 800 to be logically coupled to other devices including I/O components 820, some of which may be built-in.

Illustrative I/O components include a microphone, joystick, game pad, satellite dish, scanner, printer, display device, wireless device, a controller (such as a keyboard and a mouse), a natural user interface (NUI) (such as touch interaction, pen [or stylus] gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 800. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include radio(s) 824. The radio 824 transmits and receives radio communications. The computing device may be a wireless terminal adapted to receive communications and media over various wireless networks. Computing device 800 may communicate via wireless protocols, such as code-division multiple access ("CDMA"), Global System for Mobiles ("GSM"), or time-division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:

a processor; and computer storage memory having computer-executable instructions stored thereon that, when executed by the processor, configure the computing system to perform operations comprising:

identifying a set of product assets associated with a product based on relevance to intent of a query input by a user;

generating, via a large language model, a video summary that provides a manner in which to generate a video associated with the product, the set of product assets relevant to the intent of the query input by the user and associated with the product;

identifying a video duration for the user based on a predictive model trained using historical video engagement;

generating the video associated with the product based on the video summary and the video duration identified for the user; and providing, for display via a user interface, the video that includes content relevant to the intent of the query input by the user and corresponds with the video duration identified for the user.

2. The computing system of claim 1, wherein the set of product assets comprise a ranked set of product assets based on relevance to the intent of the query input by the user.

3. The computing system of claim 1, wherein the set of product assets are identified as relevant to the intent of the query using a retrieval process.

4. The computing system of claim 1 further comprising identifying catalog context and using the catalog context to generate the video summary.

5. The computing system of claim 1 further comprising determining the intent of the query using the query input by the user and user interaction data.

6. The computing system of claim 1, wherein the video summary is generated using the large language model that takes, as input, a prompt including an indication of the set of product assets relevant to the intent of the query and an indication of the intent of the query input by the user.

7. The computing system of claim 1, wherein the video summary includes a text summary indicating an order of product assets for generating the video.

8. The computing system of claim 1, wherein the video is generated using a generative video model that takes, as input, a prompt including the video summary and the video duration identified for the user.

9. The computing system of claim 1 further comprising identifying the video duration for the user using user profile data and/or the intent of the query input by the user.

10. A computer-implemented method comprising:

ranking product assets of a set of product assets associated with a product based on relevance to a query intent identified for a query;

generating, via a large language model, a video summary that provides a manner in which to generate a video associated with the product based on the ranked product assets relevant to the query intent;

identifying a video duration via supervised learning based on historical video abandonment rates and/or user engagement rates with video content associated with conversions;

generating, via a generative video model, the video associated with the product based on the video summary and the video duration identified for a user; and providing, for display via a user interface, the video.

11. The computer-implemented method of claim 10, wherein the product assets are ranked based on user profile data and data associated with a product catalog.

12. The computer-implemented method of claim 10 further comprising identifying the set of product assets from a product catalog using a fine-tuned large language model.

13. The computer-implemented method of claim 10, wherein the video summary includes an order for the ranked product assets to appear in the video.

14. One or more computer storage media having computer-executable instructions embodied thereon that, when executed by one or more processors, cause the one or more processors to perform a method, the method comprising:

generating a prompt that includes an indication of an order for product assets based on relevance to a query intent associated with a product and a video duration identified for presenting a video, wherein the product assets comprise video portions and the video duration is identified for a user based on a predictive model trained using historical video engagement;

providing the prompt, as input, to a generative video model;

obtaining, as output from the generative video model, the video associated with the product, wherein the video includes a plurality of the product assets in the order indicated in the prompt and corresponds with the video duration; and causing display, via a user interface, of the video.

15. The media of claim 14, wherein the prompt further includes the query intent, a product catalog context, a set of user profile data, a query, a set of product data, or a combination thereof.

16. The media of claim 14, wherein the query intent is identified based on a query input by the user and the video duration is identified for the user.

17. The media of claim 14, wherein the order for the product assets is generated using a large language model.

* * * * *